(12) United States Patent
Haggmark-Bell

(10) Patent No.: US 9,573,495 B2
(45) Date of Patent: Feb. 21, 2017

(54) HIGH BACK BOOSTER SEAT/CHILD RESTRAINT

(71) Applicant: Ann Haggmark-Bell, Solna (SE)

(72) Inventor: Ann Haggmark-Bell, Solna (SE)

(73) Assignee: SAKTA AB, Stockholm (SE)

( * ) Notice: Subject to any disclaimer, the term of this patent is extended or adjusted under 35 U.S.C. 154(b) by 0 days.

(21) Appl. No.: 14/389,539

(22) PCT Filed: Dec. 17, 2012

(86) PCT No.: PCT/SE2012/051412
§ 371 (c)(1),
(2) Date: Sep. 30, 2014

(87) PCT Pub. No.: WO2013/151474
PCT Pub. Date: Oct. 10, 2013

(65) Prior Publication Data
US 2015/0069802 A1  Mar. 12, 2015

(30) Foreign Application Priority Data

Apr. 4, 2012 (SE) .................................... 1250343-9

(51) Int. Cl.
*B60N 2/44* (2006.01)
*B60N 2/28* (2006.01)

(52) U.S. Cl.
CPC ............ *B60N 2/2803* (2013.01); *B60N 2/286* (2013.01); *B60N 2/2866* (2013.01); *B60N 2/44* (2013.01)

(58) Field of Classification Search
CPC ....................................................... B60N 2/44
(Continued)

(56) References Cited

U.S. PATENT DOCUMENTS

| 4,790,593 A * | 12/1988 | Davalos ............... B60N 2/2884 297/250.1 |
| 5,624,156 A * | 4/1997 | Leal .......................... A47C 7/72 297/217.3 |

(Continued)

FOREIGN PATENT DOCUMENTS

| DE | 202004007872 | 9/2004 |
| EP | 2269861 | 1/2011 |
| JP | 2009-184503 | 8/2009 |

OTHER PUBLICATIONS

International Search Report dated Jun. 13, 2013, corresponding to PCT/SE2012/051412.
(Continued)

*Primary Examiner* — Timothy J Brindley
(74) *Attorney, Agent, or Firm* — Young & Thompson

(57) ABSTRACT

A high back booster seat or child restraint designed to be used by a child during transport in vehicles or transport elements such as, for example, a car, bus, airplane and similar, which high back booster seat or child restraint is provided with a seat cushion with a rear part arranged to be located next to a back support in the vehicle or transport element. In the region of the rear part of the seat cushion (1) of the high back booster seat or child restraint on at least one side of the high back booster seat or child restraint there is arranged an illumination arrangement (7) built into the high back booster seat or child restraint, arranged to illuminate the region at the side of the high back booster seat or child restraint.

10 Claims, 1 Drawing Sheet

Figure 1:
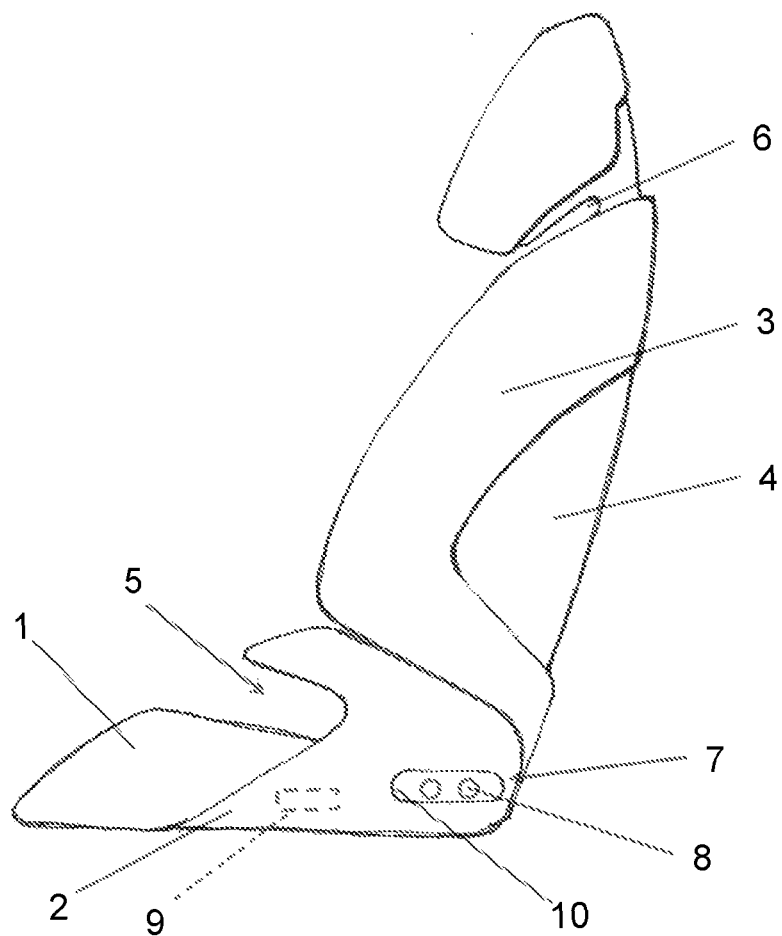

(58) Field of Classification Search
USPC .......................................... 297/250.1, 217.6
See application file for complete search history.

(56) References Cited

U.S. PATENT DOCUMENTS

| | | | | |
|---|---|---|---|---|
| 5,775,771 | A * | 7/1998 | La Cour | B60N 2/3084 297/188.04 |
| 5,806,924 | A * | 9/1998 | Gonas | B60N 2/2821 160/37 |
| 6,092,917 | A * | 7/2000 | Litke | B60Q 3/0296 362/488 |
| 6,126,233 | A * | 10/2000 | Gaetano | A47C 7/725 297/217.6 |
| 6,702,380 | B2 * | 3/2004 | Bedard | A47C 15/006 297/250.1 |
| 7,188,898 | B2 * | 3/2007 | Patterson | B60N 2/002 297/217.2 |
| 7,201,444 | B2 * | 4/2007 | Schimmoller | B60N 2/26 297/217.3 |
| 7,422,283 | B2 * | 9/2008 | Patterson | B60N 2/2806 297/217.2 |
| 8,007,043 | B1 * | 8/2011 | Vuong | B60N 2/28 297/217.3 |
| 2001/0002092 | A1 * | 5/2001 | Reitze | B60N 2/44 297/217.6 |
| 2001/0002169 | A1 * | 5/2001 | Reitze | B60Q 3/0293 362/486 |
| 2002/0067616 | A1 | 6/2002 | Soga et al. | |
| 2006/0087165 | A1 * | 4/2006 | Gharabegian | A47C 7/725 297/217.6 |
| 2010/0038941 | A1 * | 2/2010 | Fiore, Jr. | B60N 2/2851 297/217.6 |

OTHER PUBLICATIONS

Extended European search report, dated Oct. 29, 2015; Application No. 12873803.6.

* cited by examiner

HIGH BACK BOOSTER SEAT/CHILD RESTRAINT

The present invention relates to a high back booster seat or child restraint designed to be used by a child during transport in vehicles or transport means, such as, for example, a car, bus, airplane and similar, which high back booster seat is provided with a seat cushion and a back support that is connected to the seat cushion, and the child restraint is provided with only a corresponding seat cushion, and is used for children who are sufficiently large to sit facing the direction of travel. Such high back booster seats and child restraints are normally provided with guides in order to guide a seat belt arranged in the vehicle or transport means for the restraint of its passengers. The high back booster seat is designed and arranged to be placed on a normal seat in a vehicle or transport means, with the seat cushion of the high back booster seat supported by the seat of the vehicle or transport means, and with the back support of the high back booster seat arranged to be supported against the back support of the vehicle or transport means. The child restraint is intended in a corresponding manner to be supported by the seat of the vehicle or transport means, and with its rear turned to face the back support of the vehicle or transport means.

It is normally an adult who must fasten the seat belt during the use of such a high back booster seat or child restraint, and it may be difficult, particularly when it is dark, to see where the belt is to be drawn and to see in particular where it is to be fastened in a belt lock arranged in the vehicle or transport means. Even if illumination is available in the vehicle or transport means, it is often the case that both the high back booster seat or child restraint itself and the child obscure the light that is available.

EP 2269861 A1 reveals a system with LED illumination points built into a high back booster seat, which points are arranged to be successively illuminated in order to provide guidance for a user who is to fasten the high back booster seat in a vehicle such that the user threads the seat belt of the vehicle through the correct fixture points in the high back booster seat and in the right order. This system is arranged to be activated through an activation switch being depressed such that an LED illumination point starts to blink at the first location at which the seat belt of the vehicle is to be threaded. When this has been done, a contact or sensor detects the location of the belt and extinguishes the first blinking LED illumination point, in order to instead illuminate a second blinking LED illumination point that shows where the belt is subsequently to be inserted, which illumination point is in turn extinguished when the belt has been placed in the correct manner, etc., if there are further locations through which the belt is to be threaded through slits for the attachment of the high back booster seat, or its lower frame, in the vehicle. Such a system, however, does not provide any help in facilitating the locking of the seat belt through illuminating the region around the belt lock in the vehicle or transport means.

It is therefore one purpose of the present invention to achieve a solution to the problem mentioned above, such that it becomes easier for the person who is to fasten a child in such a high back booster seat or child restraint to be able to see where the lock of the seat belt is to be attached in the vehicle or transport means.

The above-mentioned purpose of the invention is achieved with a high back booster seat in which there is arranged in the region of connection between the seat cushion and the back support of the high back booster seat on at least one side of the high back booster seat an illumination arrangement built into the high back booster seat arranged to illuminate the region at the side of the high back booster seat. The corresponding purpose is achieved for a child restraint through there being arranged in a rear side part of the child restraint on at least one side an illumination arrangement built into the child restraint and arranged to illuminate the region at the side of the child restraint.

It is preferable that an illumination arrangement is arranged on both sides of the high back booster seat or child restraint such that it can illuminate the region at the side of the restraint or seat where there is an attachment for the seat belt, independently of which side of the restraint or seat this attachment is located.

Figure 2:
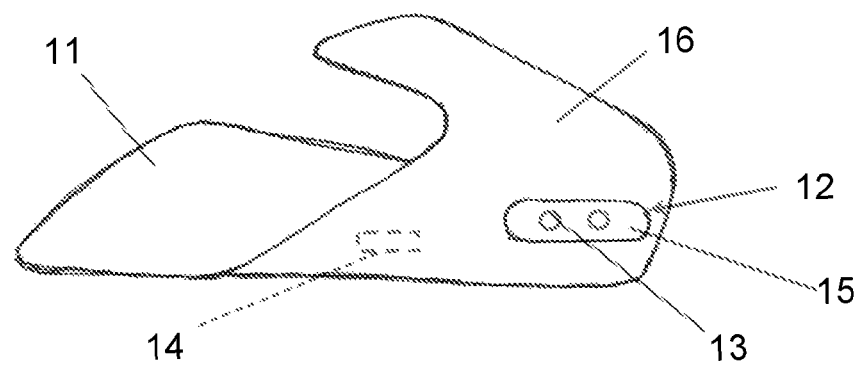

The invention will now be described in more detail in the form of a non-limiting embodiment, illustrated with the aid of the attached drawings, where FIG. 1 shows a side view of a high back booster seat provided with an illumination arrangement according to the invention, shown schematically, and where FIG. 2 shows a side view of a child restraint with an illumination arrangement according to the invention, shown schematically.

FIG. 1 shows the embodiment of the invention in which it concerns a high back booster seat, which comprises a seat cushion 1 that has a hard external shell 2 and a padded seat, where a back support 3 is coupled to the rear edge of the seat cushion 1. Also the back support 3 has a hard external back support shell 4, and normally some form of covering or padding for the surface that comes into contact with the child who is using the high back booster seat. The hard shells 2, 4 are normally formed from a hard plastic material. The hard shells may be designed such that they are integrated into one unit, or they may be two separate parts that are united with each other at the rear part of the shell 2 of the seat cushion and the lower part of the shell 4 of the back support.

Guides 5, 6 for a seat belt are also arranged in the shells 2, 4 of the high back booster seat, with which guides it is possible for a child to be held in the high back booster seat and in the vehicle or transport means. At the transition between the shell 2 of the seat cushion and the shell 4 of the back support, there are guides for that part of the lower part of the seat belt, which is not only attached at the vehicle or transport means but also demonstrates a locking tongue that is united with the belt such that it surrounds it and can be displaced along the belt, such that it is possible to unite the locking tongue with a belt lock that is attached at the vehicle or transport means.

It is the problem of being able to see where the belt lock is located and being able to insert the locking tongue into the belt lock and locking it there that is the problem that the invention intends to solve by making it easier to see the location of the belt lock.

For this, there is arranged in any one of the shells 2, 4 an illumination arrangement 7, arranged to illuminate the region at the side of the high back booster seat at its rear part at the transition between the seat cushion 1 and the back support 3. The illumination arrangement 7 comprises at least one source of light 8 located in one of the shells 2, 4 of the high back booster seat, and a power supply 9, in order to supply power to the source of light 8.

The source of light 8 may advantageously be located behind a protective transparent panel 10, and it is appropriate that this panel lies flush with the surface of the shell 2, 4 in which the illumination arrangement 7 is arranged. The panel 10 may be, for example, coupled with a switch for the source of light 8, such that the source of light is switched on through the panel 10 being pressed inwards towards the centre of the high back booster seat. It is obvious that it is possible also to arrange a separate switch in the high back booster seat to switch on and switch off the illumination arrangement 7.

It is appropriate that the illumination arrangement 7 is arranged in both sides of the high back booster seat, such that a belt lock can be illuminated independently of which side of the high back booster seat it is located.

It is preferable that the power supply 9 is a battery, which may be in a concealed location, for example behind a removable hatch, in any one of the shells 2, 4. It is appropriate that the power supply 9 is arranged to be common for both illumination arrangements 7 in the high back booster seat, if this is provided with two illumination arrangements. It is, of course, also conceivable that the power supply in the high back booster seat is connected by a cable to the electrical system of the vehicle or transport means, in order to obtain power in this way.

It is appropriate that the source of light 8 consists of one or several light-emitting diodes, in order to carry out the intended illumination of the belt lock in an energy-efficient manner. It is appropriate that the illumination arrangement 7 comprises also an automatic time-controlled facility such that it is disconnected after a certain period of time after it has been activated, if it has not been manually extinguished before this, in order to save the capacity of the battery.

FIG. 2 shows the embodiment of the invention in which it is a child restraint, and not a high back booster seat, and it differs from the embodiment described above in principle solely through it not having a back support, having only a seat cushion 11 and a shell 16 for the seat cushion. It is in this case obvious that the illumination arrangement 12 is arranged in the shell 16, and to be more precise in its rear part, i.e. in that part that is located during use most closely to the back support of the vehicle or transport means. It is, to be sure, this part of the child restraint that will be located when in use most closely to the belt lock that is arranged in the vehicle or transport means. It is appropriate that the illumination arrangement 12 is designed in the same way as has been described in association with FIG. 1, and that it comprises at least one source of light 13, driven by a battery 14 arranged in the shell 16 of the child restraint. Also in this case can a panel 15 that covers the at least one source of light 13 be arranged as switch for the illumination arrangement.

The invention claimed is:

1. A high back booster seat or child restraint designed to be used by a child during transport in vehicle or transport means, comprising:
   a seat cushion with a rear part arranged to be located next to a back support in the vehicle or transport means,
   a shell that defines guides with forward facing surfaces that, in use, receive a seat belt,
   wherein the seat cushion includes a forward side, an opposite rear side, and two lateral sides that extend from the forward edge to the rear edge, and
   an illumination arrangement located in the shell on at least one of the lateral sides of the seat cushion located below and to the rear of forward facing surfaces that, in use, receives the seat belt, in a region laterally nearer the rear side than the forward facing surface.

2. The high back booster seat or child restraint according to claim 1, wherein one of the illumination arrangement (7; 12) is located in the shell on each of the lateral sides of the seat cushion located below and to the rear of forward facing surfaces that, in use, receives the seat belt, in the region laterally nearer the rear side than the forward facing surface.

3. A high back booster seat or child restraint designed to be used by a child during transport in vehicle or transport means, comprising:
   a seat cushion with a rear part arranged to be located next to a back support in the vehicle or transport means,
   a shell that defines guides with forward facing surfaces that, in use, receive a seat belt,
   wherein the seat cushion includes a forward side, an opposite rear side, and two lateral sides that extend from the forward edge to the rear edge, and
   an illumination arrangement (7; 12) located in the shell below and to the rear of forward facing surfaces that, in use, receives the seat belt, in a region part located during use most closely to the back support of the vehicle or transport means.

4. The high back booster seat or child restraint according to claim 3, wherein one of the illumination arrangement (7; 12) is located in the shell on each of the lateral sides of the seat cushion located below and to the rear of forward facing surfaces that, in use, receives the seat belt, in a region part located during use most closely to the back support of the vehicle or transport means.

5. A high back booster seat or child restraint designed to be used by a child during transport in vehicles or transport means, such as, for example, a car, bus, airplane and similar, comprising:
   a seat cushion with a rear part, the seat cushion being designed to be mountable and demountable in the vehicle or transport means,
   wherein when mounted in the vehicle or transport means, the seat cushion is located next to a back support in the vehicle or transport means,
   an illumination arrangement (7; 12) built into a rear part of at least one lateral side of the high back booster seat or child restraint, the illumination arrangement (7; 12) arranged to illuminate a region at the side of the high back booster seat or child restraint near the back support in the vehicle or transport means, the illumination arrangement being battery powered, and
   guides with forward facing surfaces that, in use, receive a seat belt,
   wherein the illumination arrangement (7; 12) is located below and to the rear of the forward facing surfaces that, in use, receive the seat belt.

6. The high back booster seat or child restraint according to claim 5, wherein the illumination arrangement (7, 12) is arranged at opposite sides of the high back booster seat or child restraint such that the illumination arrangement (7, 12) illuminates the rear region at both sides of the high back booster seat or child restraint.

7. The high back booster seat or child restraint according to claim 5, wherein the illumination arrangement (7; 12) comprises at least one source of light (8; 13) located in a shell (2, 4; 16) of the high back booster seat or child restraint.

8. The high back booster seat or child restraint according to claim 7, wherein the source of light 8; 13) is located behind a protective transparent panel (10; 15) that lies flush with the surface of the shell (2, 4; 16) in which the illumination arrangement (7; 12) is arranged.

9. The high back booster seat or child restraint according to claim 8, wherein the panel (10, 15) is coupled with a switch for the source of light (8; 13) such that the source of light is switched on by the panel (10; 15) being pressed inwards towards the center of the high back booster seat or child restraint.

10. The high back booster seat or child restraint according to claim 8, wherein the illumination arrangement (7; 12) comprises also an automatic time-controlled facility such that it is disconnected after a certain period of time after it has been activated.

\* \* \* \* \*